July 26, 1960   S. FONER   2,946,948
MAGNETIC TEST APPARATUS
Filed June 20, 1957   3 Sheets-Sheet 1

INVENTOR
SIMON FONER
BY Joseph Weingarten
ATTORNEY

July 26, 1960

S. FONER 2,946,948

MAGNETIC TEST APPARATUS

Filed June 20, 1957

INVENTOR
SIMON FONER

BY Joseph Weingarten

ATTORNEY

July 26, 1960 S. FONER 2,946,948
MAGNETIC TEST APPARATUS
Filed June 20, 1957 3 Sheets-Sheet 3

INVENTOR
SIMON FONER
BY Joseph Weingarten
ATTORNEY

{ # United States Patent Office

2,946,948
Patented July 26, 1960

2,946,948

MAGNETIC TEST APPARATUS

Simon Foner, Cambridge, Mass.
(31 Payson Terrace, Belmont 78, Mass.)

Filed June 20, 1957, Ser. No. 666,933

33 Claims. (Cl. 324—34)

The present invention relates in general to apparatus for measuring the magnetic characteristics of a relatively small specimen of matter and more particularly concerns a novel vibrating sample magnetometer of high sensitivity, precision and versatility as both a laboratory tool and a routine testing device, which is low in cost by virtue of simplicity of mechanical design and the absence of critical components in the associated electrical system.

By definition unit magnetization, or more specifically, unit magnetic moment, in the centimeter gram second system, is possessed by a magnet formed by magnetic poles of opposite sign and of unit strength, one centimeter apart. The magnetic moment may be expressed as units per gram or per cubic centimeter. Techniques for measuring the magnetic moment of a sample generally fall into one of two broad classes, those involving the measurement of forces resulting from a portion or all of a sample of the material being placed in a non-uniform magnetic field, and those involving the measurement of flux changes sensed by inductive pickup means, such as a solenoid. The latter class may be further subdivided into methods wherein the sensed flux change results from a reversal of an applied magnetic field, or the complete removal of the sample from the sensing coil within the applied magnetic field, and into more recently developed techniques wherein the applied magnetic field is oriented substantially parallel to the axis of the sensing coil, and either the coil or sample is oscillated along the direction of the magnetic field.

Indirect methods for determining magnetic moment may also be employed and include measurement of the Faraday effect, microwave resonance, and ferromagnetic Hall effect. In measuring Faraday effect, a sample of known thickness is placed in a magnetic field of known strength and energized with a transverse electromagnetic wave of known polarization. This wave emerges from the sample with its plane of polarization rotated through an angle related to the degree of magnetic moment of the sample. Microwave resonance measurements for ferromagnetic materials usually involve placing an ellipsoidal sample (not spherical) of known eccentricity in a microwave structure, energizing the sample with microwave magnetic fields and noting the magnitude of an applied saturating magnetic field at which the sample absorbs maximum energy. This magnetic field is related to the degree of magnetization, sample geometry, microwave frequency, magnetic field direction relative to the sample geometry, magnetic anisotropy and gyromagnetic ratio of the material. Measurement of the ferromagnetic Hall effect involves placing the sample in a magnetic field of known strength, changing the magnetic field strength by a known increment, and measuring the resulting change in Hall potential across the sample, such change being related to the degree of magnetic moment in a known manner. For a detailed description of the last method, reference is made to a paper by Simon Foner, entitled "Hall Effect and Magnetic Properties of Armco Iron," page 1648, Physical Review, March 15, 1956.

Indirect methods of measurement are disadvantageous because it is essential to have a knowledge of the exact relation between the measured indirect effect and magnetic moment. This is generally not known for new materials. Moreover, such effects are not detectable for all materials.

The accuracy of results obtained by force measurements is limited because the field at the sample is generally non-uniform, and such measurements are exceedingly sensitive to sample position and size, and the field gradient which is difficult to reproduce and measure. Furthermore, these techniques are not easily adaptable to routine measurements or to measurements seeking to determine the functional relationship between the magnetic moment, the crystallographic orientation of the sample and the magnetic field.

Of the earlier mentioned flux measurement techniques, the first is transient in nature, and hence, of limited sensitivity.

The prior oscillating coil or sample techniques require that the applied magnetic field be substantially parallel to the axis of the pickup coils and the axis along which the coil or sample is oscillated. To provide such a magnetic field, it has been found necessary to employ either a solenoid type magnet, which is expensive, requires high current, and is generally unavailable in most laboratories; or a modified electromagnet, with access holes drilled to accommodate the moving element. For a description of such a vibrating coil technique, reference is made to a paper by D. O. Smith, entitled "Development of a Vibrating-Coil Magnetometer," page 261, Review of Scientific Instruments, May 1956. This technique presents other disadvantages. Extremely uniform fields are required and small non-uniformities in field are difficult to eliminate, corrections for magnetic effects due to the sample container, changes in field uniformity, and changes in field magnitude must be made, the mechanical system is complex and costly, and the various adjustments are critical, requiring a highly skilled operator.

The present invention contemplates and has as a primary object the provision of methods and means for measuring the magnetic moment of a sample which is oscillated along an axis substantially perpendicular to the direction of the applied magnetic field.

Another object of the invention is the provision of a magnetometer operable in conjunction with magnetic fields available from conventional laboratory magnets without modifications.

A further object of the invention is the provision of a magnetometer suitable for directly measuring magnetic moment as a function of temperature, magnetic field, crystallographic orientation of the sample, or pressure.

It is another object of the invention to provide a magnetometer according to the preceding objects which is suitable for making measurements of solids, liquids, or gases.

Still another object of the invention is the provision of a magnetometer which accurately measures magnetic moment of a sample, yet is relatively insensitive to minor sample displacements, vibration amplitude, frequency, amplifier gain, small field variations, or external vibrations.

Still a further object of the invention is the provision of a magnetometer suitable for making routine measurements accurately and rapidly with a technique so simple that an unskilled, inexperienced operator can readily perform a relatively large number of such tests on a routine basis.

It is still another object of the invention to provide means for determining the spatial orientation of the magnetic moment vector within the sample.

A further object of the invention is to provide a means to measure the field in a magnet by using a sample material of known magnetic properties. According to the invention, a sample whose magnetic moment is to be determined is supported within a magnetic field aligned substantially along a reference axis or direction. A small permanent magnet (or equivalent electromagnet) is mechanically connected to the supported sample some distance therefrom, and the two are synchronously oscillated whereby the sample motion defines a path substantially perpendicular to the reference direction. First and second inductive pickup means are disposed adjacent the sample and permanent magnet respectively. This second means provides an output reference signal which is compared with the signal from the first inductive pickup means, the signal from the latter being indicative of the magnetic moment of the sample.

In a more specific form of the invention, a small sample of accurately known weight is positioned within the air gap of an electromagnet on a rod which also supports the small permanent magnet in a region outside the air gap, the axis of the rod being substantially perpendicular to the direction of the magnetic field within the air gap. The purpose of the electromagnet or an equivalent permanent magnet is to produce a magnetic moment in the sample. However, the magnetometer can obviously be used to examine permanently magnetized samples without an applied external field. A first pair of solenoids is arranged within the air gap adjacent to the sample on diametrically opposite sides of the rod, the solenoid axes being parallel to said rod. A second pair of solenoids is placed adjacent the permanent magnet in a like manner.

The coils in each pair are connected together so that signals derived across each coil in response to the associated vibrating magnetic element are cumulatively combined while signals induced across each coil from stray magnetic fields or vibrations effectively cancel. The rod is mechanically coupled to a vibrating element, most conveniently, the diaphragm of a loudspeaker, and the latter energized with an alternating current signal to synchronously oscillate the sample and permanent magnet along a line substantially perpendicular to the magnetic field within the air gap. A reference signal is derived from the second pair of solenoids and is coupled through a precision attenuator whereas the first pair of coils is coupled to a phase shift network. The phase shift introduced by the latter network is just enough to compensate for the phase difference between the signals derived across the first and second pairs of solenoids. The output signal from the phase shift network, in phase with the signal derived across the second pair of solenoids, is differentially combined with the latter signal to provide an output difference signal. The precision attenuator is adjusted until this difference signal is substantially zero, whereby its setting is then proportional to and independent of amplifier gain, vibration amplitude and vibration frequency for suitable coil geometries. Settings of the attenuator may be calibrated by noting its values for samples of known magnetic moment. Once calibrated, measurement of magnetic moment is rapidly and accurately accomplished.

In another aspect of the invention, much higher sensitivity may be obtained by applying the loudspeaker driving signal to one input of a phase sensitive detector which is simultaneously energized by the amplified difference signal. The output of the phase sensitive detector is coupled to conventional recording apparatus, whose output when stabilized is precisely related to magnetic moment.

Other features, objects, and advantages of the invention will become apparent from the following specification when read in connection with the accompanying drawing in which.

Figure 8A:
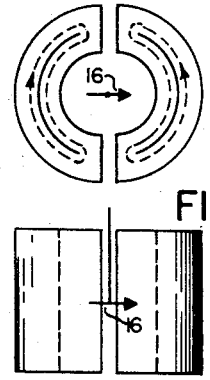
Figure 8B:
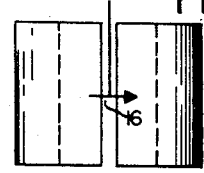
Figure 11:
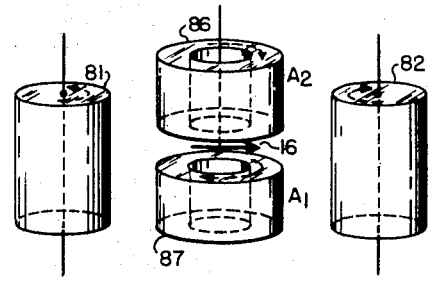
Figure 9:
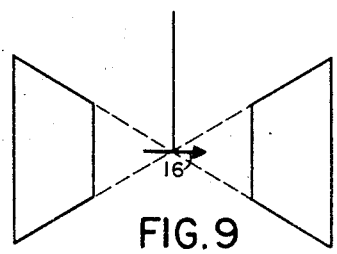
Figure 10:
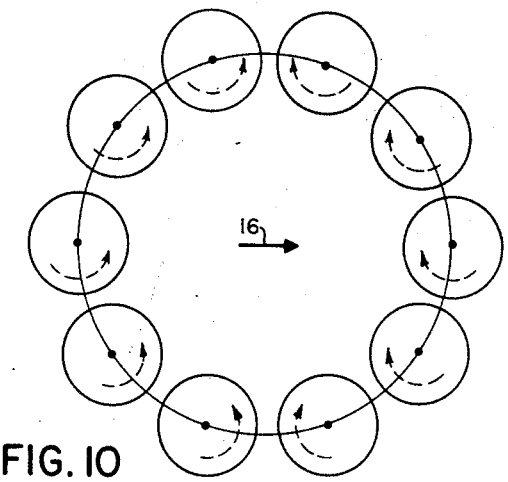

Figs. 8A and B illustrate another arrangement of two coils having special configuration;

Fig. 9 illustrates the arrangement of Fig. 8 with the exception that the coil forms are tapered;

Fig. 10 illustrates an arrangement utilizing an even number of pickup coils; and Fig. 11 illustrates a coil configuration wherein the sample is oscillated in the region between two coils displaced along the same axis.

Figure 1:
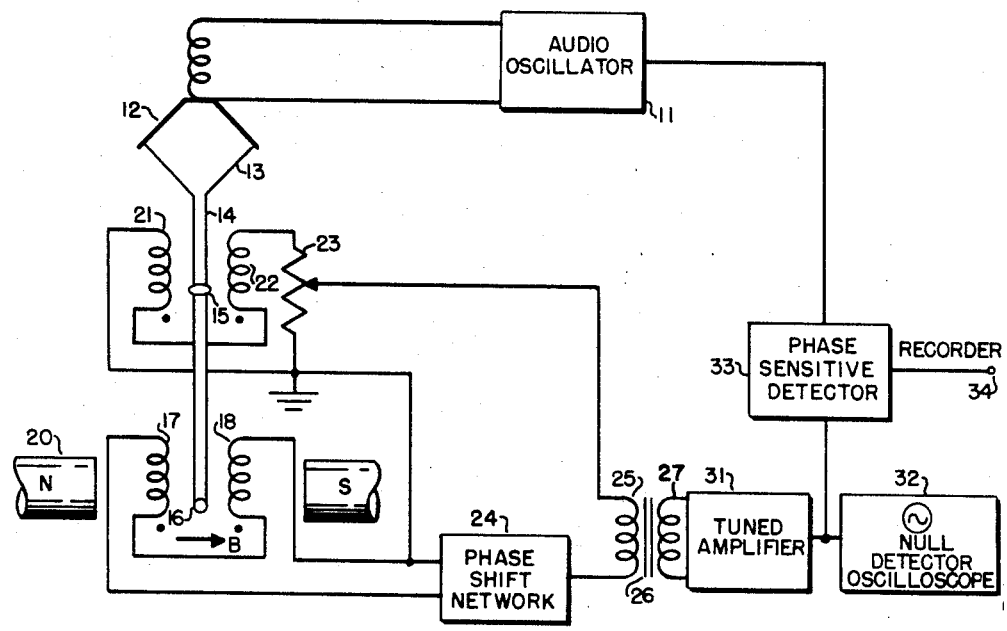
Fig. 1 is a combined block-diagrammatic illustration of the magnetometer of this invention and electrical system associated therewith.

With reference now to the drawing and more particularly Fig. 1 thereof, a preferred embodiment of the invention is illustrated in diagrammatic form. An audio oscillator 11 energizes a loudspeaker 12 whose diaphragm is joined by conic support member 13 to rod 14 to which small permanent magnet 15 and sample 16 are spaced and secured. Coils 17 and 18 adjacent sample 16 constitute a first inductive pickup arrangement, which together with sample 16 are positioned within a magnetic field indicated by the vector B furnished by the plane, confronting poles of magnet 20.

Coils 21 and 22, positioned adjacent to permanent magnet 15 form a second inductive pickup and are serially wired as indicated and connected across precision potentiometer 23. The signal derived from serially connected coils 17 and 18 is applied to the phase shift network 24 which permits adjustment of the phase of this signal so that it may coincide with the attenuated signal output of the potentiometer.

The output signal from phase shift network 24 is differentially combined with the signal derived from the second pair of coils 21 and 22 in the primary 25 of transformer 26 to provide a difference output signal at secondary 27, which is in turn applied to tuned amplifier 31. The output of tuned amplifier 31 is sensed by null detector, oscilloscope 32.

The output of tuned amplifier 31 may also be applied, simultaneously or alternatively as desired, to phase sensitive detector 33 which is activated by the signal from audio oscillator 11, to provide an output signal at terminal 34 suitable for energizing a conventional signal recorder.

Briefly, operation of this apparatus is as follows. A low frequency signal, for example, 90 cycles per second, from audio oscillator 11 is effective in correspondingly vibrating the diaphragm of loudspeaker 12. Consequently, rod 14, secured to the diaphragm by conic member 13, together with permanent magnet 15 and sample 16, oscillates along an axis perpendicularly oriented with respect to the magnetic field represented by vector B.

Magnet 15 is positioned so that its poles fall along a line which passes through similar coils 21 and 22, oriented to coincide with the point where the variation of signal output for a change in coil position is minimized. Thus, the north pole is adjacent one coil while the south pole is adjacent the other, and oscillation of the magnet produces field variations, and hence induced voltages which are cumulatively combined by virtue of the indicated series connection. Stray field variations from external sources, however, induce voltages which effectively cancel. The signal impressed across potentiometer 23 is therefore that resulting only from the oscillation of permanent magnet 15.

Sample 16 is effective in distorting the magnetic field B in its immediate vicinity, the degree of such distortion being related to the direction and magnitude of the magnetic moment of the sample for a given applied field and to sample size. Oscillation of the sample results in a corresponding change in the position of the sample-distorted field, which change induces a voltage across coils 17 and 18, in much the same manner as that induced by permanent magnet 15 in coils 21 and 22. Hence, connection of coils 17 and 18 as indicated yields the same advantages with respect to the elimination of extraneous signals due to stray effects as obtained by the arrangement of coils 21 and 22. The signal output of coils 17 and 18 is due entirely, then, to the oscillation of sample 16.

The sample signal derived across coils 17 and 18 is applied to phase shift network 24, whose function is to bring the sample signal into phase coincidence with the attenuated reference signal derived from coils 21 and 22. Both attenuated reference and sample signals are combined in the primary 25 of transformer 26 to provide a difference signal across the secondary 27. The latter is in turn amplified by tuned amplifier 31, arranged to pass only signals whose frequency is that of the audio ocillator signal. The more sharply tuned, the more amplifier 31 renders the system insensitive to noise and other undesired or stray signals.

Null detector oscilloscope 32 is normally employed to indicate the magnitude of the signal output of tuned amplifier 31, and in operation potentiometer 23 is adjusted until oscilloscope 32 indicates a minimum. The setting of potentiometer 23 under this condition is then indicative of the magnetic moment of sample 16. Calibration is readily accomplished by inserting samples of known weight and magnetic characteristics and noting the potentiometer setting for known magnetic moment. Once this calibration procedure is initially accomplished, other samples may be rapidly and accurately measured, even by an unskilled operator with little experience.

When it is desired to use a recorder, the potentiometer is fixed and the output of tuned amplifier 31 is sampled by phase sensitive detector 33 in synchronism with a sampling signal from audio oscillator 11, to continuously provide a signal at output terminal 34 which is indicative of the value of the magnetic moment of the sample. Such phase sensitive detectors are well known in the art and, therefore, a detailed description thereof is not included herein.

Before discussing a preferred mechanical embodiment of the system, it is appropriate to note certain advantages and features of the system described above. The apparatus is virtually insensitive to stray signals caused by mechanical vibration or stray magnetic fields because of the manner in which the coils in each pair are interconnected and further, because the tuned amplifier rejects signals having frequencies other than the sample oscillation frequency. When measurements are made utilizing the null detector, the apparatus is practically nonresponsive to variations in the amplitude of sample oscillation since there is a corresponding change in the amplitude of oscillation of permanent magnet 15 which produces a corresponding, balancing increase in the amplitude of the reference signal. Thus, proportional changes in reference signal and signal indicative of the sample magnetic moment do not affect the ratio of the two signals being measured by the system. Moreover, measurement of this ratio by a null detector results in the system being substantially independent of parameter variations in tuned amplifier 31, whereby the degree of precision is dependent only upon the accuracy of the setting of potentiometer 23. When this potentiometer is a commercial Helipot, accuracies of 0.5 percent may be realized without difficulty.

Figure 2:
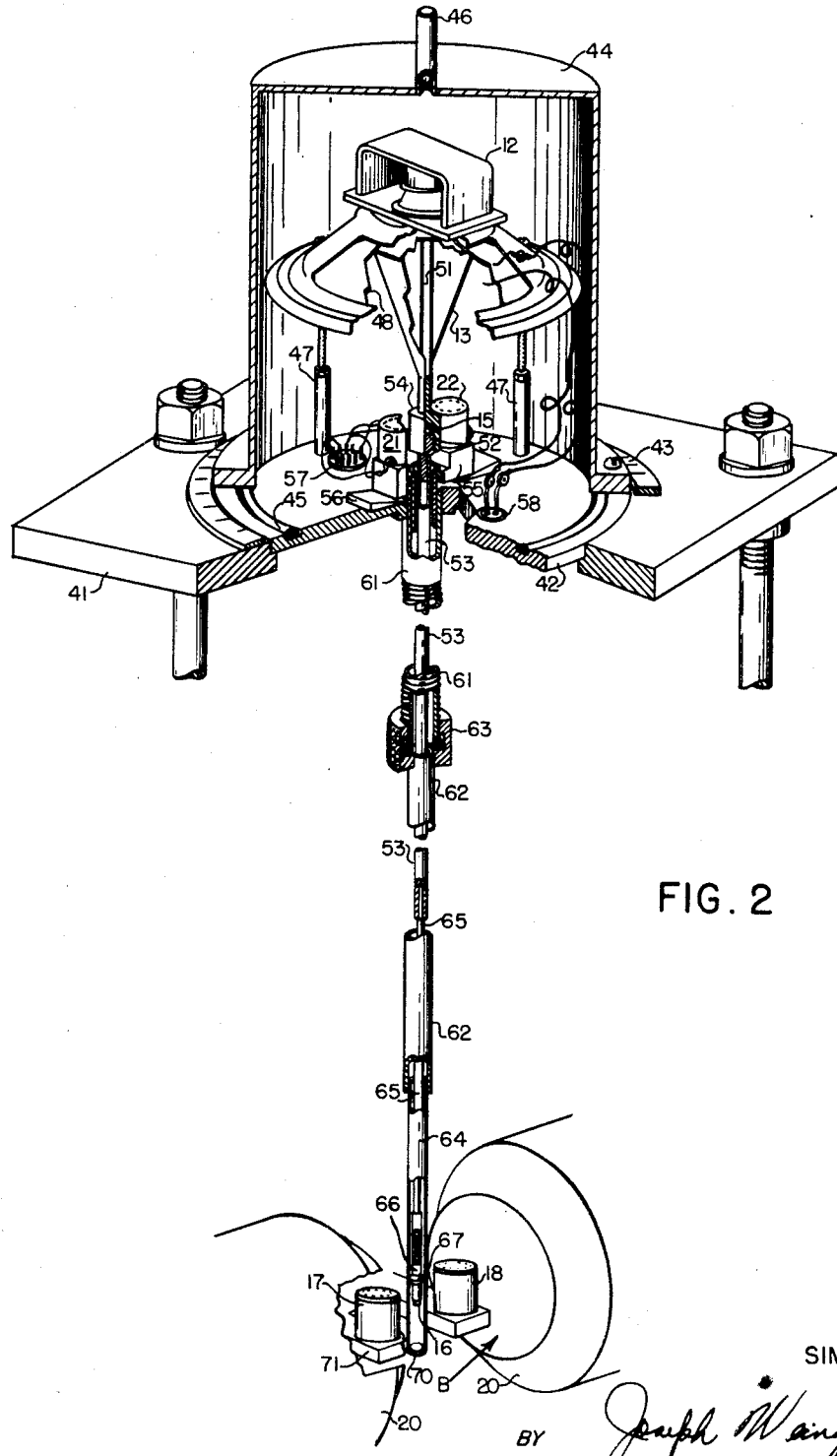
Fig. 2 is a general perspective view of the novel magnetometer.

In the description of the preferred mechanical arrangement illustrated in Fig. 2, like reference numerals will be employed to designate corresponding elements. The particular embodiment disclosed is suitable for making measurements of magnetic moment in vacuum, or under controlled pressure and is capable of measuring exceedingly small values.

With reference now to Fig. 2, member 41 supports a rotatable circular base 42 whose angular position may be accurately and reproducibly determined relative to azimuth scale 43. A cylindrical housing 44 is secured to circular base 42 through a fluid tight seal provided by O-ring 45. Hollow tube 46, which may be sealed externally, as required, enables the fluid tight volume which includes the region confined by base plate 42 and cylindrical housing 44, to be maintained at any pressure including vacuum, or to be filled with any gas.

A conventional, commercial loudspeaker 12 is supported within this chamber upon three studs 47, one of which falls in the cutaway portion and is not shown. Conic member 13 which may be stiff paper, metal or plastic is appropriately secured to diaphragm 48 and hollow rod 51. It is seen that permanent magnet 15 is secured within a magnet support structure 52 which is cemented into the upper end of hollow tube 53. The top of magnet support structure 52 likewise joins magnet cover 54, the top of which fits securely into hollow rod 51.

Coils 21 and 22 are arranged on either side of permanent magnet 15 and atop support member 55, the height of which may be adjusted by radially positioning wedges 56. Leads from coils 21 and 22 are brought out through the hermetically sealed terminal strip 57 while the leads from speaker 12 are brought out through hermetically sealed terminal strip 58.

Hollow rod 53 is surrounded by fluid tight tube 61 which opens at its upper end into the above-described chamber within housing 44 and extends downward through concentric tube 62. Tubes 61 and 62 are attached by means of a fluid tight seal, including knurled nut 63 and an appropriate O-ring. Tube 64 of smaller diameter concentrically joins the lower end of tube 62 at a fluid tight joint, the lower end of tube 64 being sealed by cap 70.

A solid rod 65 is fitted securely into the lower end of hollow rod 53 and a removable sample support 66 is threaded to the lower end of rod 65, sample 16 being secured to the latter. Spacer 67 is circumferentially mounted about sample support 66, thereby constraining oscillatory motion of the sample to the tube axis.

Coils 17 and 18 are supported upon an adjustable bracket 71 adjacent to and on diametrically opposite sides of sample 16, the sample and two coils being within the air gap of magnet 20 wherein a magnetic field, indicated by vector B, is present.

By means of this physical structure, the magnetic moment of a sample may be measured under controlled gas pressure or in the presence of a particular fluid.

The magnetic characteristics of a gas may be determined by filling the entire volume within housing 44 and tubes 61, 62 and 64 with the gas, and utilizing a sample 16 which is magnetically inert or of known magnetic properties determined in a vacuum. Oscillation of the inert sample will have the effect of moving a void space within the gas under test at the signal frequency.

Figure 3:
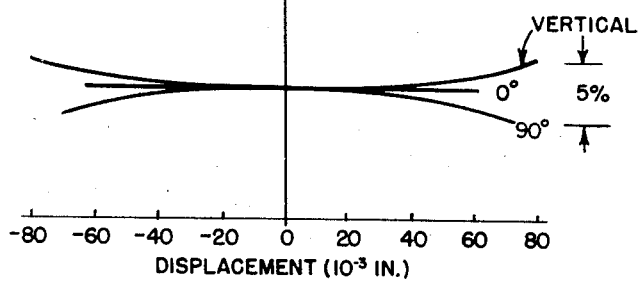
Fig. 3 is a graphical representation of signal output as a function of sample displacement in various directions from an optimum position within the magnetic field.

Coils 21 and 22 are positioned by adjusting wedges 56 before housing 44 is set in place, until maximum output signals of substantially equal amplitude are derived from each. The orientation of coils 17 and 18 is normally determined experimentally to coincide with the point where the variation of signal output for a change in coil position is minimized. This will be better understood by referring to Fig. 3 which graphically represents typical signal variations as a function of average sample position with respect to the geometric center of the coil pair. The oscillation amplitude for these measurements was about 0.010 inch and therefore not important. The curve marked "vertical" refers to vertical position of the sample relative to a line joining the centers of coils 17 and 18; the curve marked 0° refers to position of the sample along the latter line; and the curve marked 90° refers to relative position of the sample perpendicular to the latter line. It is thus seen that a "saddle" exists whereby adjustment is not too critical. The specific curvature can be varied considerably and tailored to special problems by suitable choice of coil length, coil diameter and spacing between coil axes.

Rotation of base plate 42 imparts a corresponding angular displacement to sample 16, thereby permitting measurements of magnetic moment as a function of the angular orientation of a single crystal sample versus applied magnetic field, etc. For many purposes, isotropic polycrystalline samples are used in which case no angular variation is observed. When it is desired to change the sample, knurled nut 63 is unscrewed and tubes 62 and 65 are removed, exposing sample support 66 which may now be detached and replaced with a support bearing another sample. Measurement of saturation magnetization of a sample requires a single measurement (dial reading) when the sample is in a saturating field as well as the sample weight. Complete sample change and measurement have been made in about one minute.

Various arrangements of pickup coils may be employed. In the illustration of coil configurations, the position of sample 16 is represented by a small arrow (indicative of the field disturbance caused by the sample in the magnet field) while broken line arrows indicate the direction in which the coil is wound. In each embodiment all coils are connected for the serial addition of induced voltage.

Figure 4:
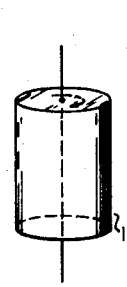
Fig. 4 illustrates one embodiment of a pickup coil arrangement for deriving a signal from the oscillating sample.
Figure 4:
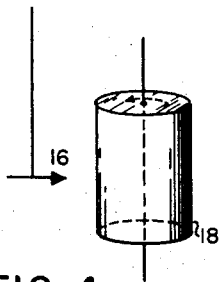

Referring now to Fig. 4, there is illustrated the general arrangement of solenoidal pickup coils described in connection with Figs. 1 and 2. Pickup coils 17 and 18 are arranged adjacent to and on diametrically opposite sides of sample 16. This arrangement is advantageous because it can be made relatively insensitive to exact sample position, vibration amplitude, floor vibration, and random magnet field changes. Furthermore, it allows the direction of magnetic moment to be determined in the plane perpendicular to the direction of oscillation, merely by observing the angular orientation of the coils with respect to the vector B for maximum signal.

Figure 5:
Fig. 5 illustrates a pickup coil arrangement utilizing a single pickup coil wherein the oscillating sample is disposed adjacent the end of the coil.
Figure 6:
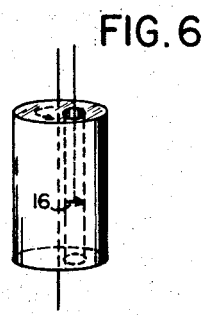
Fig. 6 illustrates a single coil pickup wherein the sample is oscillated within the coil.

With reference to Fig. 5, there is illustrated a single solenoidal pickup coil wherein the sample is oscillated immediately above the pickup coil. In Fig. 6, there is also illustrated a single pickup coil arrangement; however, sample 16 is oscillated parallel to, but offset from, the solenoid axis and within the coil.

Figure 7:
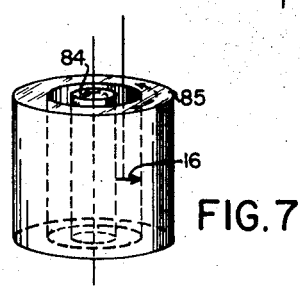
Fig. 7 illustrates a pickup coil arrangement wherein the sample is oscillated in the annular region between two coaxially aligned solenoids.

With reference to Fig. 7, the physical location of oscillating sample 16 is substantially as in Fig. 6, but is within the annular region between two coaxial coils 84 and 85. The pickup coils of Figs. 5, 6 and 7 permit a higher applied field to be used. All three arrangements are relatively insensitive to sample position in the horizontal plane and the arrangements of Figs. 6 and 7 are also relatively insensitive to changes of sample position in the vertical direction.

With reference to Fig. 8A, there is illustrated a top view of a coil arrangement which has the advantages of the arrangement of Fig. 4 and provides a somewhat higher output signal. A side view of this arrangement is illustrated in Fig. 8B. Referring to Fig. 9, there is illustrated a coil design having the same plan view as Fig. 8A, but utilizing a tapered cross section. Utilization of the tapered cross section allows exact calculations in a closed form of induced voltage, because the symmetry of the dipole field is approximated. This coil system, however, is not easily manufactured.

Referring to Fig. 10, there is illustrated essentially the arrangement of Fig. 4; however, a plurality of pairs of coils are employed, thereby increasing the output signal derived.

With reference to Fig. 11, there is illustrated a four-coil system which includes coils 81 and 82 comparable to 17 and 18 of Fig. 4 and further comprises a pair of axially aligned spaced coils 86 and 87 which may be connected to a separate measuring system of the type described in Fig. 1 to permit determination of vertical components of magnetic moment in the sample. Thus, the direction of magnetic moment vector in space may be determined.

From the description of the preferred embodiment of the invention, it is seen that this magnetometer offers numerous advantages. It can be conveniently placed over available laboratory magnets without modification. The magnetic moment may be readily measured as a function of temperature, field, crystal direction or pressure. Measurements may be obtained of the magnetic characteristics of solids, liquids, or gases. Sample temperature may be lowered as desired by inserting the sample end in a Dewar flask using any coolant or raised by similar insertion in a suitable furnace. The sample shape is not generally significant for paramagnetic materials or for ferromagnetic materials above magnetic saturation. Measurements may readily be made in a uniform magnetic field although field homogeneity can be made unimportant by maintaining the field through the magnetic sample above magnetic saturation.

The system is readily arranged to provide accurate measurements while displaying a remarkable lack of sensitivity to sample position, amplitude of oscillations, frequency of oscillation, amplifier gain, small magnetic field variations, or external vibrations. For example, using the null detector technique of Fig. 1, the magnetic moment of an 8 milligram sample of nickel has been measured to at least 0.5 percent using coils as in Fig. 2 with typical dimensions ⅝ inch diameter, ½ inch length and 1¹⁄₁₆ inches between axes; each coil was wound with 25,000 turns of insulated No. 46 wire. Using the phase sensitive detector technique of Fig. 1, with a small test coil producing a known magnetic moment, it has been demonstrated that with suitable electronics and a three minute integrating time, an equivalent magnetic moment of the order of $10^{-10}$ c.g.s. units would be detectable for a one gram sample in a field of 10,000 gausses. Coils of 55,000 turns each were used for these tests. This sensitivity compares favorably with the most sensitive force methods reported to date. Of special advantage in production applications, routine measurements may be rapidly made once calibration is complete.

Numerous modifications of and departures from the specific embodiment and variations thereof described herein will be apparent to those skilled in the art without departing from the inventive concepts. Consequently, the invention is to be construed as limited only by the spirit and scope of the appended claims.

What is claimed is:

1. Apparatus for determining the magnetic properties of a specimen of matter in a substantially uniform saturating magnetic field applied in a predetermined direction comprising, induction pickup means disposed within said field adjacent said specimen, and means for oscillating said specimen relative to said pickup means along an axis substantially perpendicular to said field direction.

2. Apparatus for determining the magnetic properties of a specimen of matter in a substantially uniform magnetic field applied in a predetermined direction comprising, a magnetized element, inductive pickup means respectively associated with said specimen and said magnetized element, and means for synchronously oscillating said specimen and said magnetized element along an axis substantially perpendicular to said magnetic field direction.

3. Apparatus as in claim 2 wherein said inductive pickup means associated with said specimen comprises a pair of solenoids arranged on diametrically opposite sides of the axis of oscillation, the axes of said solenoids being substantially parallel to said axis of oscillation, and means for connecting together said solenoids whereby signals derived across each in response to oscillation of said specimen are cumulatively combined.

4. Apparatus as in claim 2 wherein said inductive pickup means associated with said specimen comprises a solenoid having an axis parallel to, and non-symmetrically displaced from the axis of oscillation.

5. Apparatus as in claim 4 wherein said solenoid includes an opening displaced from the solenoid axis, said specimen being oscillated within said solenoid opening.

6. Apparatus as in claim 2 wherein said inductive pickup means associated with said specimen comprises a pair of coaxially arranged solenoids whose common axis is substantially parallel to the axis of oscillation, said specimen being oscillated in the region between said solenoids, and means connecting said solenoids whereby signals derived across each in response to oscillation of said specimen are cumulatively combined.

7. Apparatus as in claim 2 wherein said inductive pickup means associated with said specimen comprises a plurality of pairs of solenoids arranged about and having axes parallel to the axis of oscillation, each pair being arranged on diametrically opposite sides of said oscillation axis, and means interconnecting all of said solenoids whereby signals derived across each in response to oscillation of said specimen are cumulatively combined.

8. Apparatus as in claim 2 wherein said inductive pickup means associated with said specimen comprises first and second pairs of solenoids, said first pair of solenoids being arranged with the solenoid axes parallel to and on diametrically opposite sides of the axis of oscillation, said second pair being spaced along and concentric with said oscillation axis, and means for cumulatively combining the signals induced in each of said solenoids in response to oscillation of said specimen.

9. Apparatus as in claim 2 wherein inductive pickup means associated with said specimen comprises a pair of coils arranged on diametrically opposite sides of said oscillation axis, each turn of said coils in a plane perpendicular to said oscillation axis being generally U-shaped and embracing said oscillation axis, and means for cumulatively combining the signals induced in said coils in response to oscillation of said specimen.

10. Apparatus as in claim 9 wherein the cross-section of each coil in a plane which includes the axis of oscillation and symmetrically divides said coils is a symmetrical trapezoid, extensions of the non-parallel sides thereof intersecting substantially at a point which coincides with said specimen.

11. Apparatus for determining the magnetic properties of a specimen of matter comprising, an elongate member supporting said specimen and a reference magnet, an induction pickup disposed in the region of said specimen, means for establishing a substantially uniform magnetic field in a predetermined direction through said specimen and said pickup, means for oscillating said support member along an axis substantially perpendicular to said magnetic field direction, means associated with said reference magnet for deriving a signal during oscillation of said support member, and circuit means for comparing said signal with the output of said induction pickup.

12. Magnetometer apparatus for generating an output signal indicative of the magnetic properties of a test specimen in a substantially uniform magnetic field applied in a predetermined direction through said specimen comprising, a support for said specimen, and a coil disposed in said magnetic field in the region of said specimen and arranged to provide said output signal during oscillation of said specimen along an axis perpendicular to said magnetic field.

13. Magnetometer apparatus comprising, a specimen, means for establishing a substantially uniform magnetic field through said specimen, means for oscillating said specimen along an axis perpendicular to said magnetic field, and a coil disposed within said field closely adjacent said specimen and formed with at least one turn in a plane perpendicular to said axis of oscillation.

14. Magnetometer apparatus comprising, a magnetic specimen, means for establishing a substantially uniform magnetic field through said specimen, means for oscillating said specimen within said magnetic field along an axis perpendicular thereto, and an induction pickup formed of a pair of coils disposed in said field on opposite sides of said specimen each having at least one turn lying in a plane perpendicular to said oscillation axis, said coils being interconnected to provide an additive signal output.

15. A magnetometer comprising, a source of a relatively strong magnetic field aligned substantially along a predetermined direction, support means to which a sample may be attached, means for oscillating said support means along an axis substantially perpendicular to said field direction, and inductive pickup means disposed within said relatively strong magnetic field and adjacent said axis which provide an output signal indicative of magnetic field variations resulting from oscillation of a sample attached to said support means.

16. Magnetometer apparatus comprising, a specimen, means for establishing a substantially uniform magnetic field through said specimen, a reference magnet, means for synchronously oscillating said specimen and reference magnet along an axis perpendicular to said magnetic field, first and second coil structures closely associated respectively with said specimen and with said reference magnet, each of said coil structures being formed with at least one solenoidal winding having an axis parallel to said oscillation axis and arranged to provide signals respectively characteristic of the magnetic properties of said specimen in said field and of the motion imparted to said reference magnet.

17. Magnetometer apparatus as in claim 16 wherein said first and second coil structures are interconnected to provide an output signal characteristic of the difference between said signals induced therein due to motion of said specimen and reference magnet, respectively.

18. Magnetometer apparatus comprising, an elongate member adapted to support a permanent magnet and a relatively small magnetic test specimen at opposite ends thereof, means for axially oscillating said support member to impart corresponding synchronous oscillation to said permanent magnet and said specimen, and first and second pickup coil structures respectively disposed adjacent to said permanent magnet and said specimen, said first pickup coil structure being arranged to provide an output signal in response to axial motion of the magnetic field emanating from said permanent magnet, said second coil structure being formed with at least one winding having a plurality of turns each being non-symmetrically disposed with respect to and each lying in a plane substantially perpendicular to said support member axis.

19. Magnetometer apparatus as in claim 18 and including means for hermetically enclosing and sealing said support member including said permanent magnet and said specimen.

20. Magnetometer apparatus as in claim 19 wherein said means enclosing said support member includes an elongate tube sealed at the end supporting said specimen, and means permitting separation of at least a portion of said tube to allow removal and interchange of said specimen.

21. Magnetometer apparatus comprising, a base member, a generally circular supporting plate rotatably attached to said base member and having a central opening therein, a housing hermetically sealed to said supporting plate and defining an enclosure, a vibrator disposed within said enclosure, an elongate tubular member sealed at one end and affixed to said circular plate within said opening at the opposite end thereof, an elongate rod extending concentrically through said tubular member and affixed to said vibrator, a permanent magnet secured to said rod within said enclosure, a first induction pickup coil structure adjustably secured to said circular supporting plate adjacent said permanent magnet, means at the end of said rod opposite said vibrator and adjacent said sealed end of said tubular member for supporting a test specimen of matter, and a second induction pickup coil structure disposed outside said tubular member adjacent said test specimen support.

22. Apparatus as in claim 21 and including means on said housing permitting evacuation of said enclosure and tubular member.

23. Apparatus as in claim 21 and including means for indicating the relative azimuthal orientation of said rotatable circular supporting plate.

24. Apparatus for determining the magnetic properties of a specimen of matter in a substantially uniform magnetic field applied in a predetermined direction, a magnetized element, inductive pickup means respectively associated with said specimen and said magnetized element, means for differentially combining the signals derived from said induction pickup devices to furnish an output signal, and means for detecting said output signal.

25. Apparatus for determining the magnetic properties of a specimen of matter in a substantially uniform magnetic field, applied in a predetermined direction, a magnetized element, inductive pickup means respectively associated with said specimen and said magnetized element, means for differentially combining the signals derived from said induction pickup devices to furnish an output signal, an attenuator for adjusting the signal output of one of said induction pickup devices, and a null detector responsive to said output signal.

26. Apparatus for determining the magnetic properties of a specimen of matter in a substantially uniform magnetic field applied in a predetermined direction, a magnetized element, inductive pickup means respectively associated with said specimen and said magnetized element, means for attenuating the signal derived from one of said induction pickup devices, means for differentially combining the signal output of said attenuating means and the signal derived from the other of said induction pickup devices to yield an output signal, and means for detecting the amplitude of said output signal.

27. Apparatus as in claim 26 wherein said detecting means includes an amplifier tuned to the oscillation frequency of said specimen and magnetized element, and a null detector responsive to the output of said tuned amplifier, whereby said attenuating means may be adjusted for a condition of zero output from said tuned amplifier and the position of said attenuator may be calibrated to indicate directly the magnetic properties of said specimen.

28. Apparatus as in claim 27 and including means for adjusting the relative phase of the signals derived from said induction pickup devices.

29. Apparatus as in claim 26 wherein said detecting means includes a phase sensitive detector responsive to said output signal and to a signal at the frequency of oscillation of said specimen and magnetized element, and means for indicating the output of said phase sensitive detector.

30. Magnetometer apparatus for measuring a magnetic field within a volume determined by a specimen of matter of known magnetic properties, comprising induction pickup means within said field adjacent said specimen, means for oscillating said specimen relative to said pickup means along an axis substantially perpendicular to the direction of said field being measured, and means for detecting the output of said induction pickup means.

31. Magnetometer apparatus for measuring a magnetic field comprising, an elongate member adapted to support a specimen of matter of known magnetic moment within said field and to support a reference magnet outside of said field, an induction pickup disposed within said field in the region of said known specimen, means for oscillating said support member along an axis substantially perpendicular to said magnetic field direction, means associated with said reference magnet for deriving a signal during oscillation of said support member, and circuit means for comparing said signal with the output of said induction pickup for providing an indication of the strength of said magnetic field.

32. Apparatus for determining the magnetic properties of a specimen of matter in a substantially uniform magnetic field applied in a predetermined direction comprising, a magnetized element, means for synchronously oscillating said specimen and said magnetized element along an axis substantially perpendicular to said magnetic field direction, and inductive pickup means responsive to magnetic field variations caused by oscillation of said specimen and said magnetized element.

33. Apparatus for determining the magnetic properties of a specimen of matter in accordance with claim 32 wherein said inductive pickup means includes a coil having effective area-turns non-symmetrically distributed about said axis of oscillation of said specimen.

References Cited in the file of this patent

UNITED STATES PATENTS

| 2,459,341 | Russel | Jan. 18, 1949 |
| 2,659,857 | Anderson | Nov. 17, 1953 |
| 2,776,404 | Caldecourt | Jan. 1, 1957 |

OTHER REFERENCES

Method for Determining Magnetic Moments and for Measuring Susceptibilities and Permeabilities; Journal of Applied Physics, vol. 23, No. 9, September 1952; pp. 975–976.

Measurement of Magnetic Field Gradients; The Review of Scientific Instruments, May 1955; pp. 475–476.

Vibrating Sample Magnetometer; The Review of Scientific Instruments, July 1956; p. 548.